United States Patent [19]
Jeffords et al.

[11] Patent Number: 6,141,720
[45] Date of Patent: Oct. 31, 2000

[54] METHOD AND APPARATUS FOR COORDINATION OF A SHARED OBJECT IN A DISTRIBUTED SYSTEM

[75] Inventors: Jason Jeffords, Lee; Todd Crowley, Windham; Thomas Hazel, Dover; Donald Sexton, Newmarket, all of N.H.

[73] Assignee: Cabletron Systems, Inc., Rochester, N.H.

[21] Appl. No.: 08/873,550

[22] Filed: Jun. 12, 1997

[51] Int. Cl.[7] .................................................. G06F 13/00
[52] U.S. Cl. ........................ 710/200; 710/36; 710/108; 710/240
[58] Field of Search ................................... 710/200, 108, 710/36, 39, 40, 112, 240, 244, 220

[56] References Cited

U.S. PATENT DOCUMENTS

| | | | |
|---|---|---|---|
| 4,399,504 | 8/1983 | Obermarck et al. | 710/200 |
| 5,060,144 | 10/1991 | Sipple et al. | 710/200 |
| 5,161,227 | 11/1992 | Dias et al. | 395/674 |
| 5,226,143 | 7/1993 | Baird et al. | 711/145 |
| 5,333,319 | 7/1994 | Silen | 395/673 |
| 5,408,629 | 4/1995 | Tsuchiva et al. | 711/151 |
| 5,596,754 | 1/1997 | Lomet | 710/200 |
| 5,761,659 | 6/1998 | Bertoni | 707/8 |

FOREIGN PATENT DOCUMENTS 0 665 495 A2   2/1995   European Pat. Off. .......... G06F 9/46

OTHER PUBLICATIONS

"Object–based Semantic Real–time concurrency Control", pp. 87–96, Cingiser et al, Jan. 12, 1993.

*Primary Examiner*—Ario Etienne
*Attorney, Agent, or Firm*—Wolf, Greenfield & Sacks, P.C.

[57] ABSTRACT

Method and apparatus for coordinating access to a shared object amongst a plurality of processes in a distributed system. One process is identified as a lock owner process controlling a lock associated with the shared object. When a process needs to access the shared object, it requests control of the lock from the lock owner process. When no other process controls the lock, the lock owner process grants control to the requesting process. When another process controls the lock, the lock owner process places the requesting process in a queue and waits for the lock to become available. All accesses to the shared object are processed through the lock owner processes thus assuring coordination and synchronization among the processes.

19 Claims, 9 Drawing Sheets

METHOD AND APPARATUS FOR COORDINATION OF A SHARED OBJECT IN A DISTRIBUTED SYSTEM

RELATED CASES

This application claims priority on copending and commonly owned U.S. Ser. No. 08/681,040, filed Jul. 22, 1996 by Jeffords et al. entitled "Method For Synchronizing Processes In a Distributed System", which is hereby incorporated by reference.

This case is related to copending and commonly owned:

a) U.S. Ser. No. 08/681,040, filed Jul. 22, 1996 by Jeffords et al. entitled "Method For Synchronizing Process In a Distributed System" (Docket C0441/7071);

b) U.S. Ser. No. 08/874,104 filed concurrently herewith by Jeffords et al. entitled "Method and Apparatus For Synchronizing Transactions In a Distributed System" (Docket C0441/7098); and c) U.S. Ser. No. 08/873,549 filed concurrently herewith by Jeffords et al. entitled "Method and Apparatus For Coordinated Management of a Shared Object" (Docket C0441/7086); which are hereby incorporated by reference and from which priority is claimed.

FIELD OF THE INVENTION

The present invention is directed to controlling access to an object shared amongst a plurality of processes in a distributed system, so that the shared object is accessed by one and only one process at a time.

BACKGROUND OF THE INVENTION

1. Field of the Invention

The present invention is directed to controlling access to an object shared amongst a plurality of processes in a distributed system, so that the shared object is accessed by one and only one process at a time.

2. Discussion of the Related Art

In a distributed connection-oriented switched network, a plurality of distributed processes are employed to provide command, control and connectivity in the network; see, for example, the Virtual Network Services (VNS) described in co-pending and commonly owned U.S. Ser. No. 08/622,866 filed Mar. 29, 1996, by S. Thebaut et al. (Docket C0441/7072)which issued as U.S. Pat. No. 5,889.953 on Mar. 30, 1999, hereby incorporated by reference in its entirety. Due to constant inter-process interaction, some method is required to coordinate the functions of these processes and the objects they share. One such method is to coordinate the instantiation of the shared objects; see, for example, the Replicated Resource Management (RRM) tools described in co-pending and commonly owned U.S. Ser. No. 08/585,054 filed Jan. 11, 1996, by J. Jeffords et al. (Docket C0441/7029), hereby incorporated by reference in its entirety. In applications utilizing RRM, objects can be created or destroyed at any time and are replicated across the processes at the time of creation.

Methods are also, however, needed to manage the life-cycles of these replicated objects, e.g., coordinating access to the object and/or determining when an object is no longer needed and may be destroyed. In co-pending and commonly-owned U.S. patent application, Ser. No. unknown, filed concurrently herewith by Jeffords et al., entitled "Method and Apparatus For Coordinated Management Of a Shared Object (Docket C0441/7086) hereby incorporated by reference in its entirety, a method and apparatus are described for management and coordination of a shared object amongst a plurality of processes in a distributed system. In this system, an object has one and only one owner process which is responsible for the creation and, therefore, the destruction of the object. When the owner process determines that none of the processes at a given time are interested in the shared object, the owner process will set the shared object as a candidate for being destroyed. Prior to destruction, however, the owner process will still confirm with each other process that it is acceptable to destroy the object. When it is thus confirmed that no processes are interested in an object, then the object will be destroyed.

Another method for management and coordination of a shared object in a distributed system is described in co-pending and commonly-owned U.S. patent application, Ser. No. 08/681,040, filed Jul. 22, 1996 by Jeffords et al. entitled "Method For Synchronizing Processes In a Distributed System" (Docket C0441/7071), herein incorporated by reference in its entirety. In this system, a lock token is associated with a given shared object. This lock token is transmitted around the distributed system and captured by a process when it desires control of the associated shared object. Only when a process has possession of the token can it access the object. When a process is finished with the token, it transmits the token to a next process requiring access. Conflicts are resolved when more than one process seeks to capture the token at the same time and token loss is prevented if a process fails or is removed while possessing the token.

Thus, in a distributed system where ownership of an object is shared amongst a plurality of processes, a solution is necessary for coordinating the processes in the distributed system.

SUMMARY OF THE INVENTION

According to the present invention, a protocol is provided to coordinate synchronization between processes which share an object in a distributed system. A lock owner process controls a lock associated with a shared object. When a process desires access to the object, it requests control of the lock from the lock owner process. Only the lock owner process can grant control of the lock, and thus control of the shared object, to a requesting process. If the lock owner process determines that the lock is already controlled by another process, the requesting process will have to wait until control of the lock has been returned to the lock owner process. Thus, all transactions with regard to the shared object and its lock are performed through the lock owner process. The lock owner process is the central point of synchronization with regard to the particular shared object.

In one embodiment, a computer-implemented method of controlling access to an object shared amongst a plurality of processes in a distributed system includes steps of assigning one process as an owner of a lock associated with the shared object; when a process requires access to the shared object, the process requesting the lock from the lock owner process; when the lock owner process receives the lock request, the lock owner process determining whether or not any process has control of the lock; and when the lock owner process determines that no process has control of the lock, the lock owner process granting control of the lock to the requesting process.

Further, the lock owner process determines whether or not it is currently accessing the shared object associated with the lock.

In addition, when a first requesting process has been granted control of the lock, the first requesting process sending a message to the lock owner process when the first requesting process no longer requires access to the shared object.

When a second requesting process sends a second lock request message to the lock owner process and the first requesting process has not sent a lock release message to the lock owner process, the lock owner process placing the second requesting process in a queue; and when the first requesting process sends the lock release message to the lock owner process, the lock owner process accessing the queue and granting control of the lock to the next requesting process in the queue.

These and other features and benefits of the present invention will be set forth in the following detailed description and drawings which are given by way of example only and are in no way restrictive.

DETAILED DESCRIPTION

Figure 1:
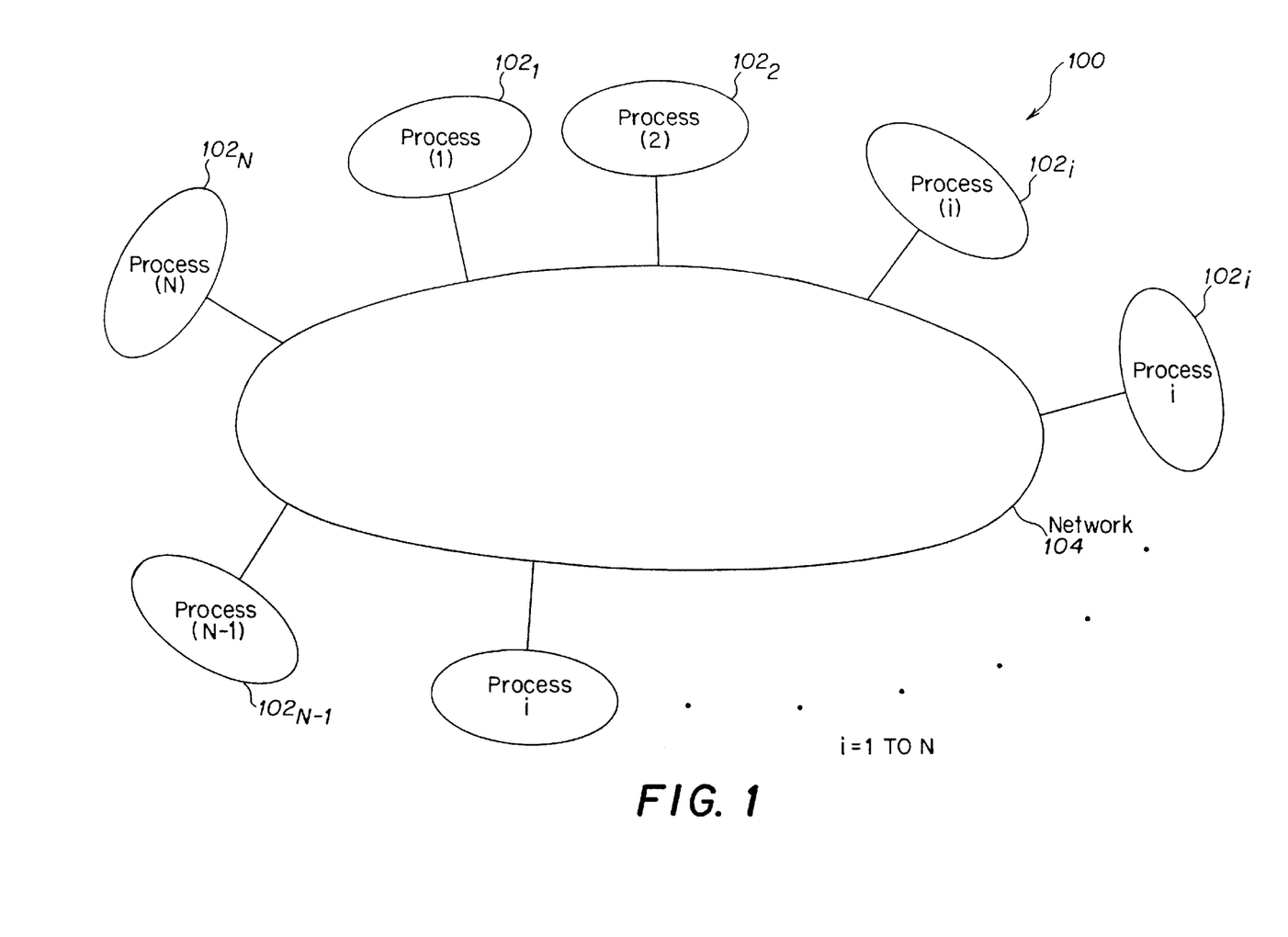
FIG. 1 is a schematic diagram of distributed processes.

FIG. 1 shows a distributed network system 100 including a plurality of processes $102_i$, where i=1 to N and N is an integer. Although the network topology 104 is shown as a ring, any topology can be used. Any of the above processes $102_i$ may be implemented in a processor such as a general purpose computer 190 shown in FIG. 2. The computer may include a central processing unit (CPU) 191, having a memory 192, a processing bus 193 by which the CPU can access the memory 192, and access to a network through a connection 194. Alternatively, the present invention may be implemented as a memory, such as a floppy disk, compact disk, or hard drive, which contains a computer program or a data structure for providing general purpose computer instructions or data for carrying out the functions of the present invention.

Figure 2:
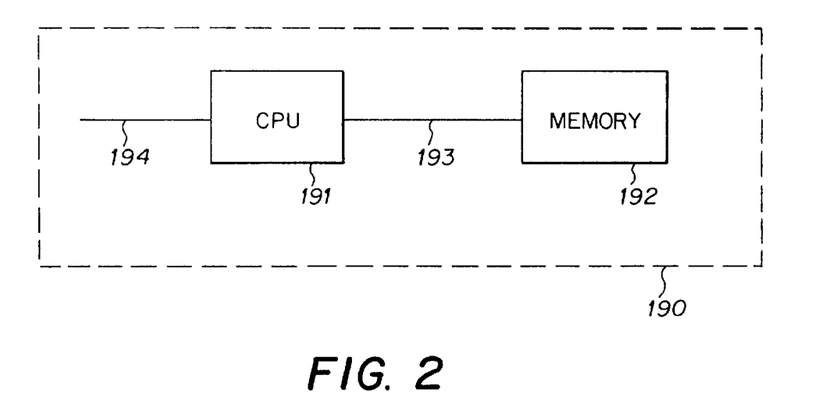
FIG. 2 is a schematic illustration of a computer apparatus for implementing the present invention.

The CPU 191 can run on various hardware platforms including, but not limited to: a SunSparc 5, 10 or 20 processor running the SunOS or Solaris operating system; and an Intel x86 (or i960) processor running Windows 3.1, Windows'95, or Windows NT (or an embedded operating system in the case of the i960).

In the present invention, one of the processes $102_1$; will be a lock owner process which controls the lock of a specific shared object. A particular process may be the lock owner for different shared objects. In the example described, there is only one shared object. The other processes in the system will be referred to as peer processes. In order to obtain the lock for the shared object, any process, i.e., the lock owner or a peer process, sends a lock request message to the lock owner process and waits for the lock to be granted. If the lock owner process fails or changes while the requesting process is waiting for the lock to be granted, a new lock request message is sent to the new lock owner process. Once the lock is granted, the requesting process holds the lock, i.e., becomes the "lock holder" process, until it releases the lock back to the lock owner process by sending a release lock message. If the lock owner process fails while the lock holder process holds the lock, the release lock message is sent to the new owner of the lock. If the lock holder process fails, the lock will be released so that a next requesting process may acquire it.

The present invention may be implemented with two sub-protocols: 1) an acquire lock sub-protocol; and 2) a lock provider or lock owner sub-protocol. Each protocol may be considered as a function implemented, for example, by a computer.

Figure 3:
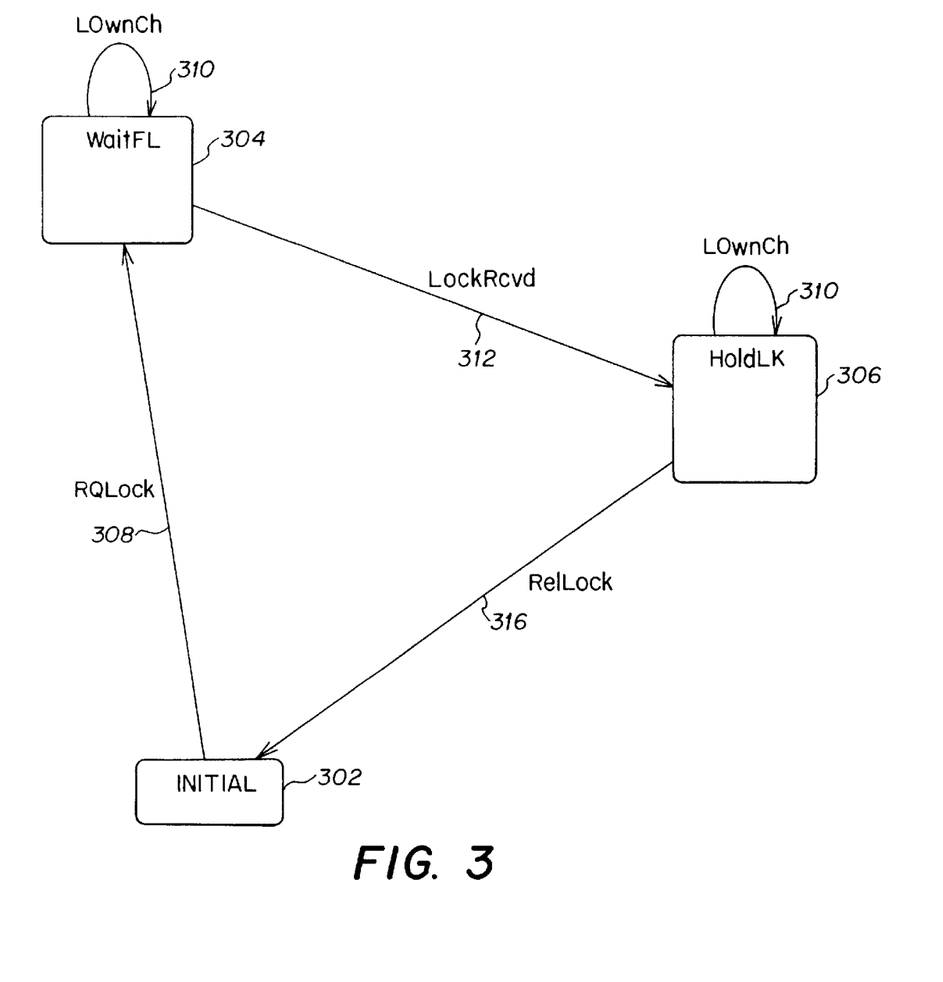
FIG. 3 is a state diagram of an Acquire Lock state machine.

A Finite State Machine (FSM) is associated with each protocol. An FSM is a common programming construct and/or method. An acquire lock state machine, associated with the first sub-protocol, is shown in FIG. 3. The three-state acquire lock state machine is implemented by both the lock owner process and by a peer process in order for either to acquire the lock for a shared object. Once a requesting process, either peer or owner, acquires the lock, the lock is held until it is returned to the lock owner.

The acquire lock state machine begins operation in an Initial state 302 (FIG. 3). In a Wait For Lock (WaitFL) state 304, the requesting process is waiting for the lock to be granted to it. In a Hold Lock (HoldLk) state 306, a requesting process has acquired the lock.

The acquire lock state machine transitions from one state to the next upon occurrence of an event. A Request Lock (RQLock) event 308, produced by a process requesting the distributed lock, causes the acquire lock state machine to transition from the Initial state 302 to the Wait For Lock state 304. The event of requesting the lock includes sending a lock request message to the lock owner process. While in the Wait For Lock state 304, a Lock Owner Change (LOwnCh) event 310 may occur, e.g., notification is received by the requesting process that the lock owner process has failed or changed. If such notice is received while in this state, a lock request would then be sent to the new lock owner process by the requesting process, since the lock had not been granted, and the old lock request is canceled. A Lock Received (LockRcvd) event 312 is produced when the lock is granted to the requesting process by the lock owner process; the acquired lock state machine of the requesting process will then transition to the Hold Lock state 306. While in the Hold Lock state 306, a Lock Owner Change event 310 may occur. This occurrence, however, does not cause a transition out of the Hold Lock state 306. Upon release of the lock, Release Lock (RelLock) event 316 occurs; a release lock message is sent to the lock owner process and the state machine transitions back to the Initial state 302.

The following table summarizes the states, events and transitions of the acquire lock state machine:

TABLE I

| STATES | Initial | WaitFL  | HoldLk   |
|--------|---------|---------|----------|
| Initial|         | RQLock  |          |
| WaitFL |         | LOwnCh  | LockRcvd |
| HoldLk | RelLock |         | LOwnCh   |

Figure 4:
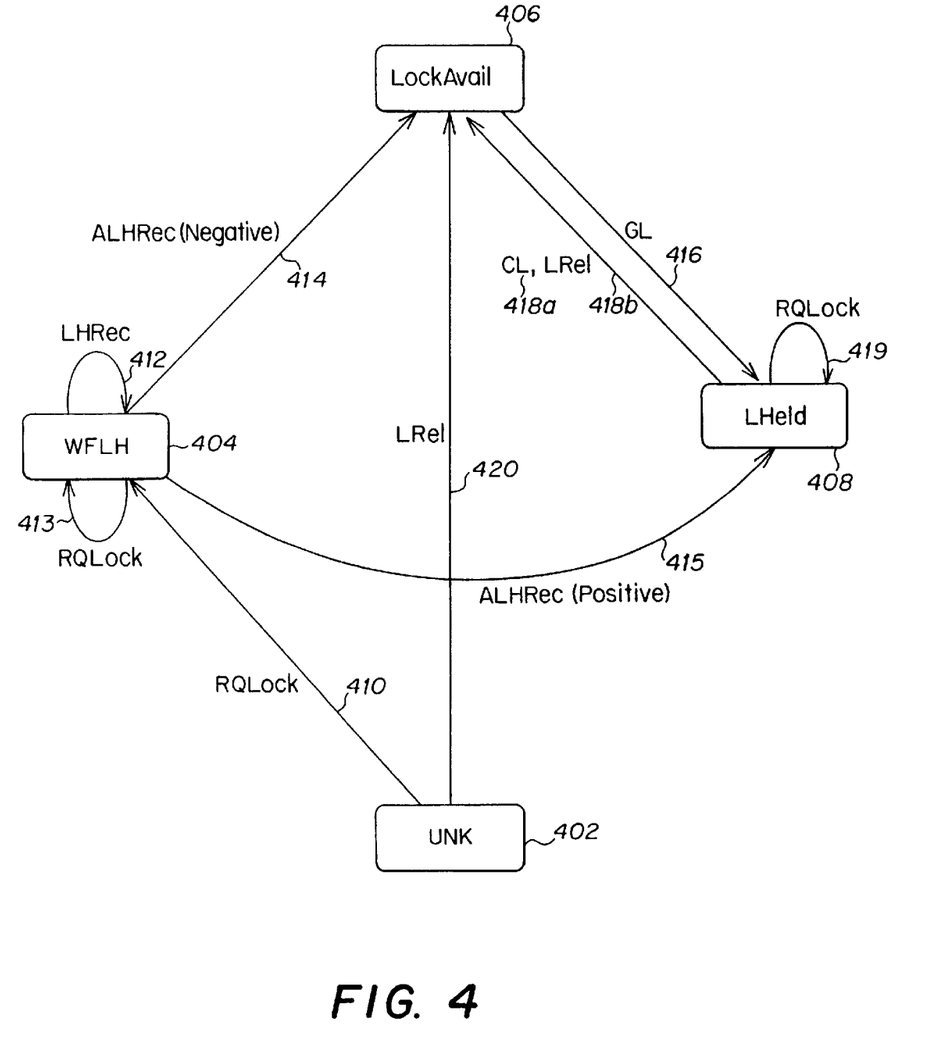
FIG. 4 is a state diagram of a Lock Provider state machine.

A lock provider Finite State Machine, associated with the lock provider sub-protocol, consists of four states with six events and is illustrated in FIG. 4. The lock provider state machine is used by the lock owner process when a lock is requested by either a requesting peer process or by the lock owner process itself. Once a requesting process acquires the lock, the lock owner process will not give the lock to any other process that requests it until the lock holder process either releases the lock back to the lock owner process or the lock holder process fails.

In an Unknown (UNK) state 402, as shown in FIG. 4, a lock owner process is initially unaware as to the status of the lock for the shared object. A Wait For Lock Holder (WFLH) state 404 occurs when the lock owner process has not yet determined if there is an active lock holder process. A Lock Available (LockAvail) state 406 is entered when the lock is available, i.e., not held by a lock holder process. A Lock Held (LHeld) state 408 occurs when the lock is being held by a lock holder process.

When a lock request is received, referred to as a Request Lock (RQLock) event 410, the lock provider state machine of the lock owner process transitions from the Unknown state 402 to the Wait For Lock Holder (WFLH) state 404. The requesting process is placed in a queue of requesting processes. The lock owner process then sends a Request Lock Holder message to all processes to identify an already existing lock holder process, if there is one. A Lock Holder Received (LHRec) event 412 occurs when a Lock Holder Response message sent in reply to a Request Lock Holder message has been received.

There are two types of responses to the Request Lock Holder message. A negative response is sent by a process which is not holding the lock. A positive response is sent by the process which is currently holding the lock. It is possible for all responses to be negative but only one response should ever be positive. While in the Wait For Lock holder state 404, when another Request Lock event 413 occurs, i.e., another process requests the lock, the second requesting process is placed in the queue of pending requests. When all responses have been received, and there is no current lock holder process, an All Lock Holder Received(Negative) (ALHRec(Negative)) event 414 is produced which causes the lock provider state machine to transition from the Wait For Lock Holder state 404 to the Lock Available state 406. Alternately, when one of the responses indicates that the lock is being held, an All Lock Holder Received(Positive) (ALHRec(Positive)) event 415 occurs and the lock provider state machine transitions to the Lock Held state 408.

Upon entering the Lock Available state 406, the lock will be granted to the next requesting process in the queue. A Give Lock (GL) event 416 is produced when in the Lock Available state and the lock is to be assigned. When the Give Lock event 416 occurs, the lock provider state machine transitions from the Lock Available state 406 to the Lock Held state 408.

If the lock holder fails, a Contact Lost (CL) event 418*a* occurs. A Lock Release Received (LRel) event 418*b* occurs when the lock holder process releases the lock. The occurrence of either the Contact Lost event 418*a* or the Lock Release Received event 418*b* will cause the lock provider state machine to transition from the Lock Held state 408 back to the Lock Available state 406. While in the Lock Hold state 408, an occurrence of a Lock Request event 419 will cause the requesting process to be placed in the queue. If the lock owner changes, the lock provider state machine is exited no matter what state it is in at the time that the lock owner change occurs. Note that a Lock Release Received event 420 causes the lock provider state machine to transition from the Unknown state 402 to the Lock Available state 406. This occurs in the situation where a new lock owner process has been chosen and the lock holder process still has the lock. Since the new lock owner process is in the unknown state 402, it has no awareness of the lock's location. When it receives the lock back from the lock holder process, it knows where the lock is, and goes directly to the Lock Available state 406. Thus, it need not pass through the Wait For Lock Hold State 404.

The following table summarizes the states, events and transitions which occur in the lock provider state machine:

TABLE II

| STATES    | UNK | WFLH             | LockAvail    | LHeld          |
|-----------|-----|------------------|--------------|----------------|
| UNK       |     | RQLock           | LRel         |                |
| WFLH      |     | LHRec<br>RQLock  | ALHRec       |                |
| LockAvail |     |                  |              | GL             |
| LHeld     |     |                  | CL, LRel     | RQLock         |

The owner-based distributed locking protocol of the present embodiment is managed by inter-process messaging. There are five different protocol messages utilized in the transaction protocol:

1) a Request Lock message is sent to the lock owner process when the distributed lock is requested by a requesting process;
2) a Request Lock Holder message is sent to all processes when a current lock holder needs to be determined by the lock owner process;
3) a Lock Holder Response message is returned to the lock owner process in response to a Request Lock Holder message;
4) a Release Lock message returns the lock to the lock owner process; and
5) a Give Lock message is sent to the new lock holder process. In addition, the present embodiment is operated within a network which has guaranteed communication services to deliver and receive messages such as TCP/IP in one embodiment.

Figure 5:
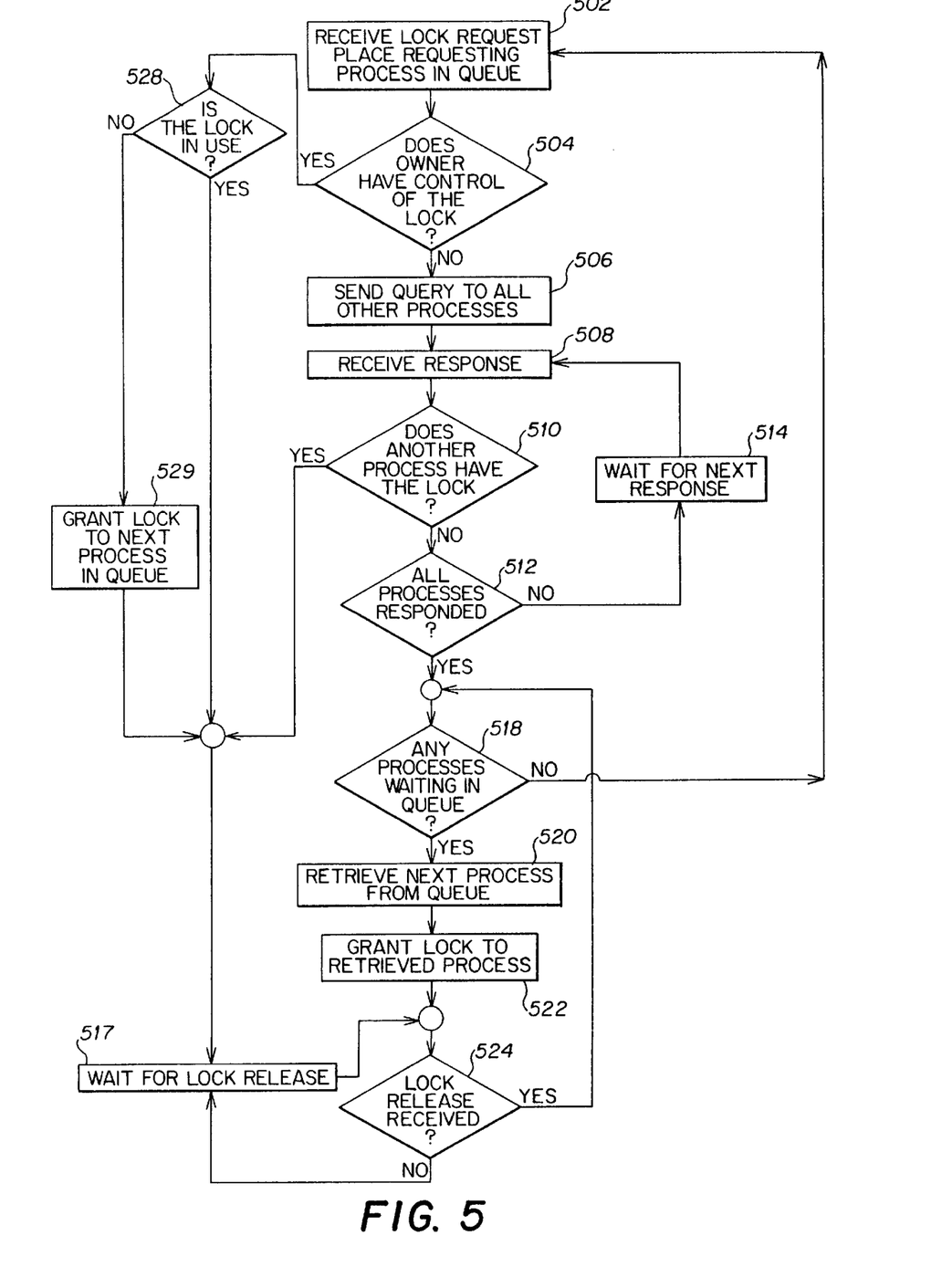
FIG. 5 is a flowchart of a process executed by the lock owner process.

Operations within the lock owner process will now be described in conjunction with the flow chart of FIG. 5.

In step 502, the lock owner process receives a request for the lock (in the form of a Request Lock message) and places the requesting process in the queue. It then makes a determination as to whether or not it has control of the lock in step 504. After the lock owner process determines it does not have control of the lock, the lock owner process then sends the Request Lock Holder message to all other processes (step 506). In step 508, a Lock Holder Response is received and the lock owner process makes a determination as to whether or not another process holds the lock (step 510). If it is a negative lock holder response then control passes to step 512 where the lock owner determines if all processes have responded. In one embodiment, the lock owner process maintains a response table listing all of the processes and an indication as to whether or not each has responded. When not all processes have responded, control passes to step 514 to wait for a next response. If a positive Lock Holder Response message was returned, i.e., there is a lock holder process, in step 510, the lock owner process waits for the lock to be released from the lock holder process (step 517).

Returning to step 512, if all processes have responded, in step 518 the lock owner process determines if there are any processes in the queue waiting to receive the lock. If there are no processes waiting in the queue, then control passes to step 502 to wait for a Lock Request. If there is a requesting process in the queue, the next requesting process is retrieved from the queue (step 520) and the lock is granted to the next retrieved requesting process (step 522). The lock owner process monitors operations for receipt of a Lock Release message (step 524), and if not received, control passes to step 517 to wait for the Lock Release message from the current lock holder process. When the Lock Release message is received, then control passes back to step 518 to determine if there are any processes waiting in the queue.

If, at step 504, the lock owner process does have control of the lock, the lock owner process determines whether or not the object is in use in step 528. If the lock owner process is in use the object control passes to step 517 to wait for the lock to be released. Otherwise, in step 529 the lock is granted to the next requesting process in the queue and the lock owner process waits for the lock release in step 517.

Figure 6:
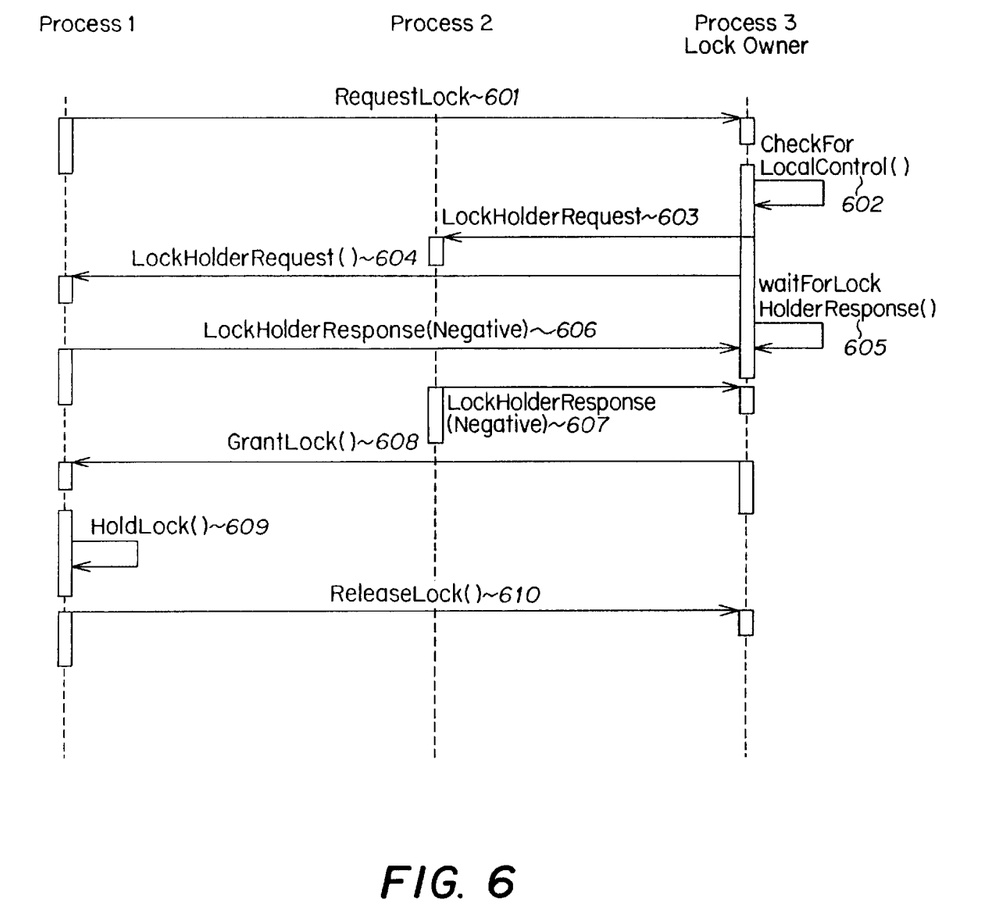
FIG. 6 is a timeline of events in a basic lock acquisition procedure.

FIG. 6 illustrates the message sequence (timeline) between the lock owner process and other processes with regard to a basic lock acquisition. Three processes 1, 2, 3 are shown, with process 3 set as the lock owner process. In step 601, process 1 sends a Request Lock message to the lock owner process, process 3. Process 3 checks for local control of the lock in step 602; in steps 603, 604 process 3 sends the Lock Holder Request message to the other processes to determine if either of them has the lock. The lock owner process waits for the Lock Holder responses in step 605; in steps 606, 607, processes 1, 2 return negative Lock Holder Response messages indicating that neither of them possesses the lock. The lock owner process then grants the lock to the requesting process 1 in step 608. In step 609, process 1 enters the Hold Lock state. At some point thereafter, in step 610, process 1 releases the lock back to process 3.

A scenario where multiple lock requests are submitted to the lock owner process will now be discussed in conjunction with the timeline/flowchart of FIG. 7. Once again, there are three processes 1, 2, 3, with process 3 being the lock owner process.

Process 1 sends a Request Lock message to the lock owner process in step 701, causing the lock owner process 3 to check for local control in step 702. The lock owner process then sends Lock Holder Request messages in steps 703, 704 and waits for Lock Holder Response messages in step 705. Processes 1, 2 each respond with a negative Lock Holder Response message in steps 706 and 707. In step 708, however, process 2 submits a Request Lock message to the lock owner process and, as a result, in steps 709, 710 processes 1 and 2 are both in the Wait For Lock state. Additionally, in step 711, the lock owner process itself requests the lock in step 711 and enters the Wait For Lock state in step 712.

In step 713 the lock owner process grants the lock to process 1, which is the first pending lock request, and process 1 enters the Hold Lock state in step 714. Subsequently, in step 715 process 1 releases the lock and the lock owner process grants the lock to process 2 in step 716 since the next pending lock request is from process 2. Process 2 enters the Hold Lock state in step 717 and when finished sends the Release Lock message back to the lock owner process in step 718. The lock owner process than grants the lock to itself (process 3) in step 719 and enters the Hold Lock state in step 720, until it finally releases the lock in step 721.

In the present invention, when the lock owner process fails, another process will be made and the lock owner process and operation will continue. When the lock owner process fails, the remaining processes decide who the new lock owner process is going to be. The lock's new owner is found from a common algorithm run within each process. This algorithm is deterministic, i.e., there is only one possible new lock owner determination outcome. A new lock owner process is found from amongst the remaining processes and the algorithm guarantees that each process will "agree" on the lock's new owner even though the processes need never communicate with one another with regard to choosing the new lock owner process. The new lock owner process will then implement the protocol of granting the lock. A scenario where the lock owner process fails during a multiple lock request operation will now be discussed in conjunction with the timeline/flowchart of FIG. 8.

Figure 7:
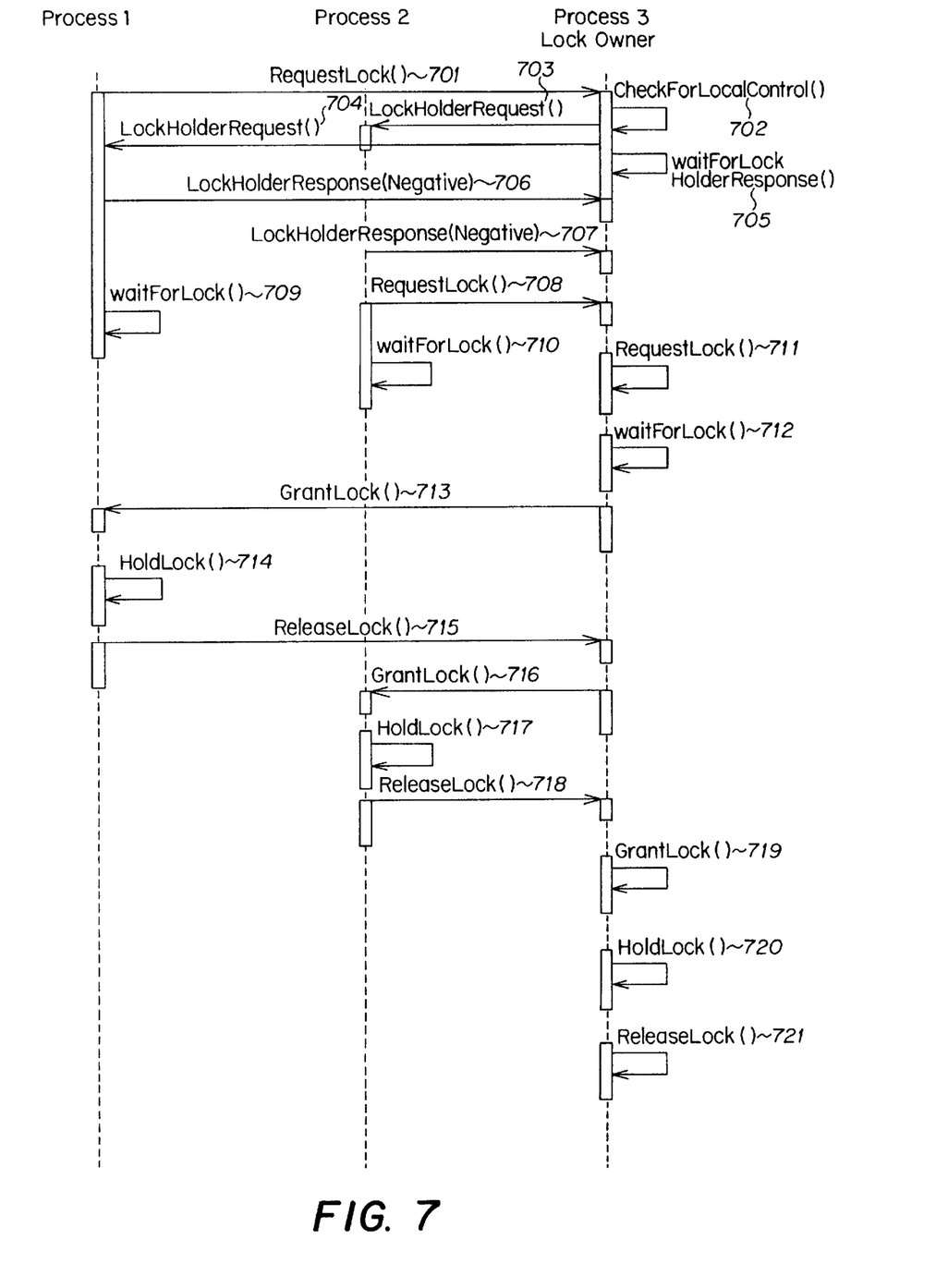
FIG. 7 is a timeline of events in a multiple lock acquisition procedure.
Figure 8:
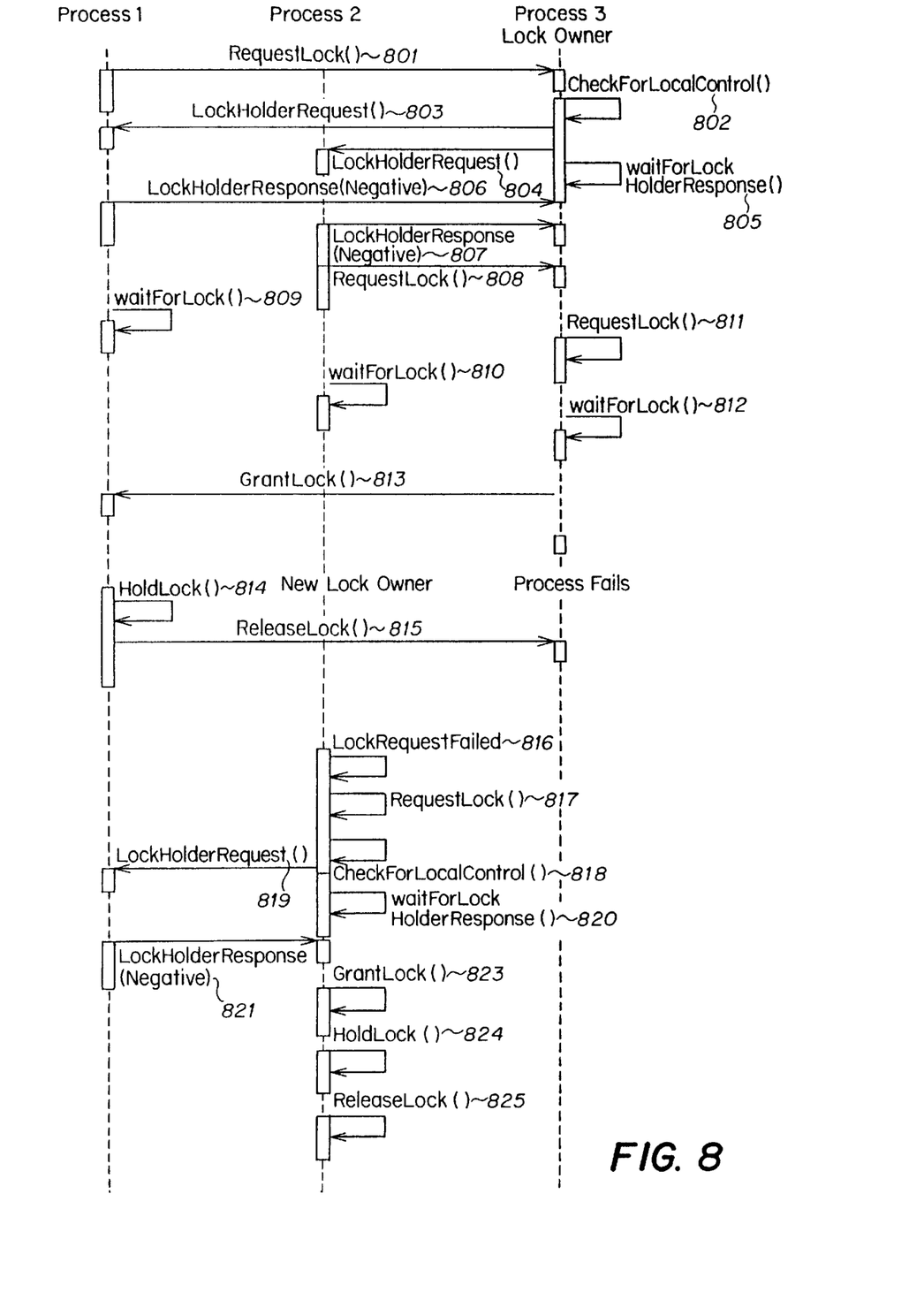
FIG. 8 is a timeline of events in a multiple lock request procedure where the owner process fails.

Steps 801–814 are the same as steps 701–714 as shown in FIG. 7. After process 1 enters the Hold Lock state in step 814, however, the lock owner process fails and process 2 becomes the new lock owner. In step 815, process 1 sends the Release Lock to the lock owner process it had received the lock from, i.e., process 3. In step 816, process 2 remains in the Wait For Lock state but has received a lock request failed message since process 2 is aware that the lock owner process 3 has failed. Therefore, in step 817, process 2 sends a lock request to itself since it is the new lock owner. Process 2 checks for local control of the lock in step 818 and then sends a Lock Holder Request message in step 819 to the remaining process 1. Process 2 then waits for a Lock Holder Response in step 820. Process 1 sends a negative Lock Holder Response message (step 821) since it does not have the lock, causing process 2 to grant the lock to itself (step 823) and to enter the Hold Lock state (step 824). When process 2 is done with the lock, it then sends a Release Lock message to itself (step 825).

According to the present invention, ownership of the lock may change from one process to another without the prior owner necessarily having failed, e.g., under an ownership change protocol. Ownership may change, for example, when the processing load needs to be balanced. Since the lock owner does all of the processing for the object, when one process is being overloaded, the ownership will change, thus spreading the processing needs amongst the processes. Such a change in ownership will now be described in conjunction with the timeline/flowchart shown in FIG. 9.

Figure 9:
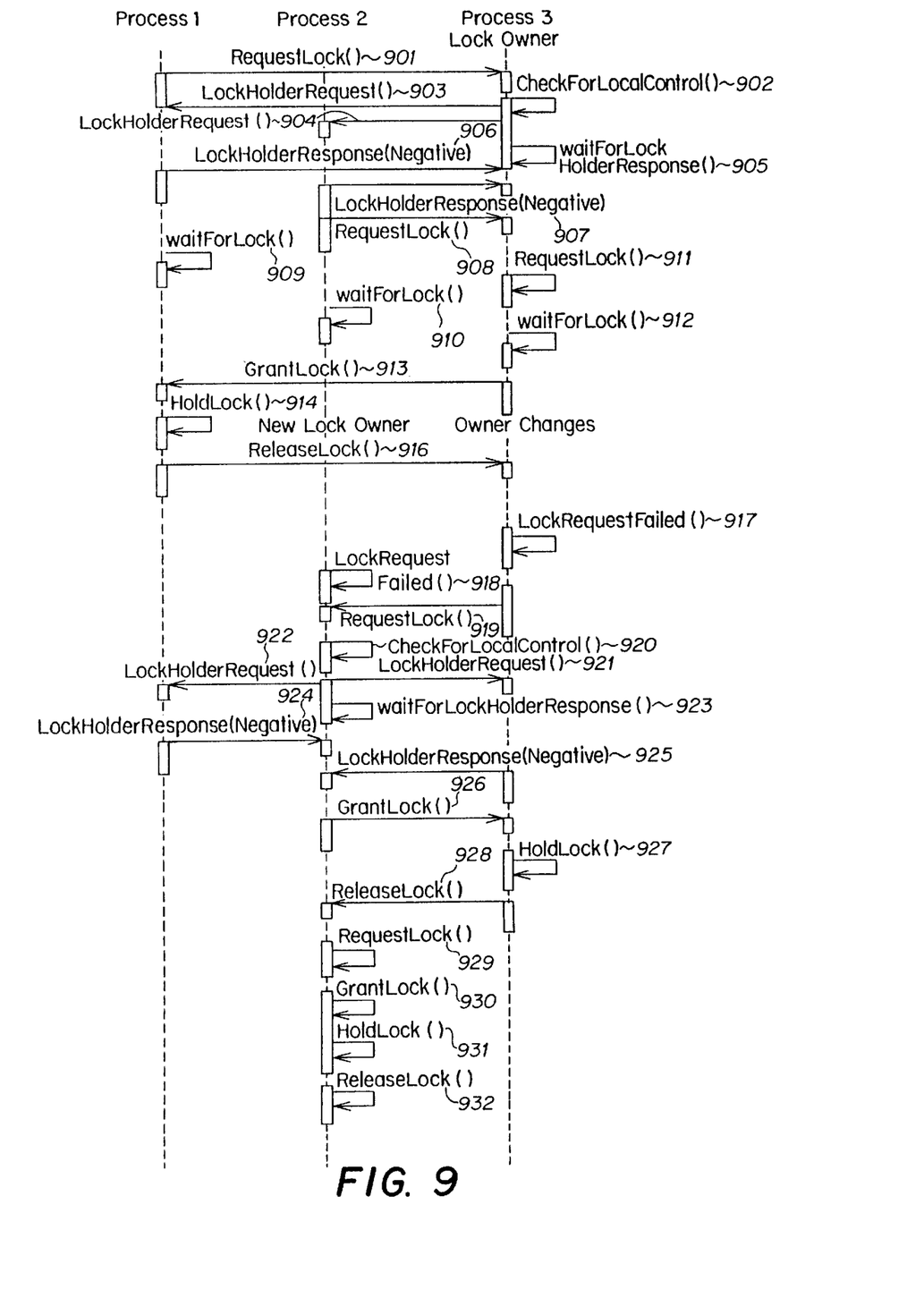
FIG. 9 is a timeline of a multiple lock request procedure where the lock owner process changes.

Steps 901–914 are the same as steps 701–714 in FIG. 7. In FIG. 9, however, after process 3, the lock owner, has granted the lock in step 913 to process 1, ownership changes with process 2 becoming the new lock owner process (note that process 3 is still operating). When process 1 is finished with the shared object, it returns the Release Lock message to process 3, (step 916); process 3 was the lock owner process from which process 1 received the lock. Process 3 and process 2 receive lock request failed messages (steps 917, 918) indicating that the process from which they had requested the lock is no longer the lock owner. Process 3 then sends a new request lock message to process 2, the new lock owner process (step 919). Process 2 checks for local control of the lock (step 920), sends the Lock Holder Request to process 1 and process 3 (step 921, 922), and waits for the Lock Holder Responses (step 923). Process 1 and process 3 return negative Lock Holder Response messages since neither of them has the lock (steps 924, 925). As a result, process 2 grants (step 926) the lock to process 3, the next pending Lock Request, and process 3 enters the Hold Lock state (step 927). Recall that in step 908, process 2 had requested the lock prior to process 3 (step 911), however, since the lock owner process subsequently failed, those two requests were no longer pending. Process 3 then repeated its Request Lock as above in step 919, and therefore became the next process to be granted control of the lock.

In step 928, process 3 releases the lock back to process 2 which then grants the lock to itself (step 930) in response to the Request Lock (step 929), enters the lock hold state (step 931), and then at some later point releases the lock (step 932).

Additionally, similar to the scenario as discussed above with regard to FIG. 9, ownership of the lock may change from one process to another without the prior owner necessarily having failed and where the lock is still held by the lock holder process during the lock ownership change. Such a scenario will now be described in conjunction with the timeline/flowchart shown in FIG. 10.

Figure 10:
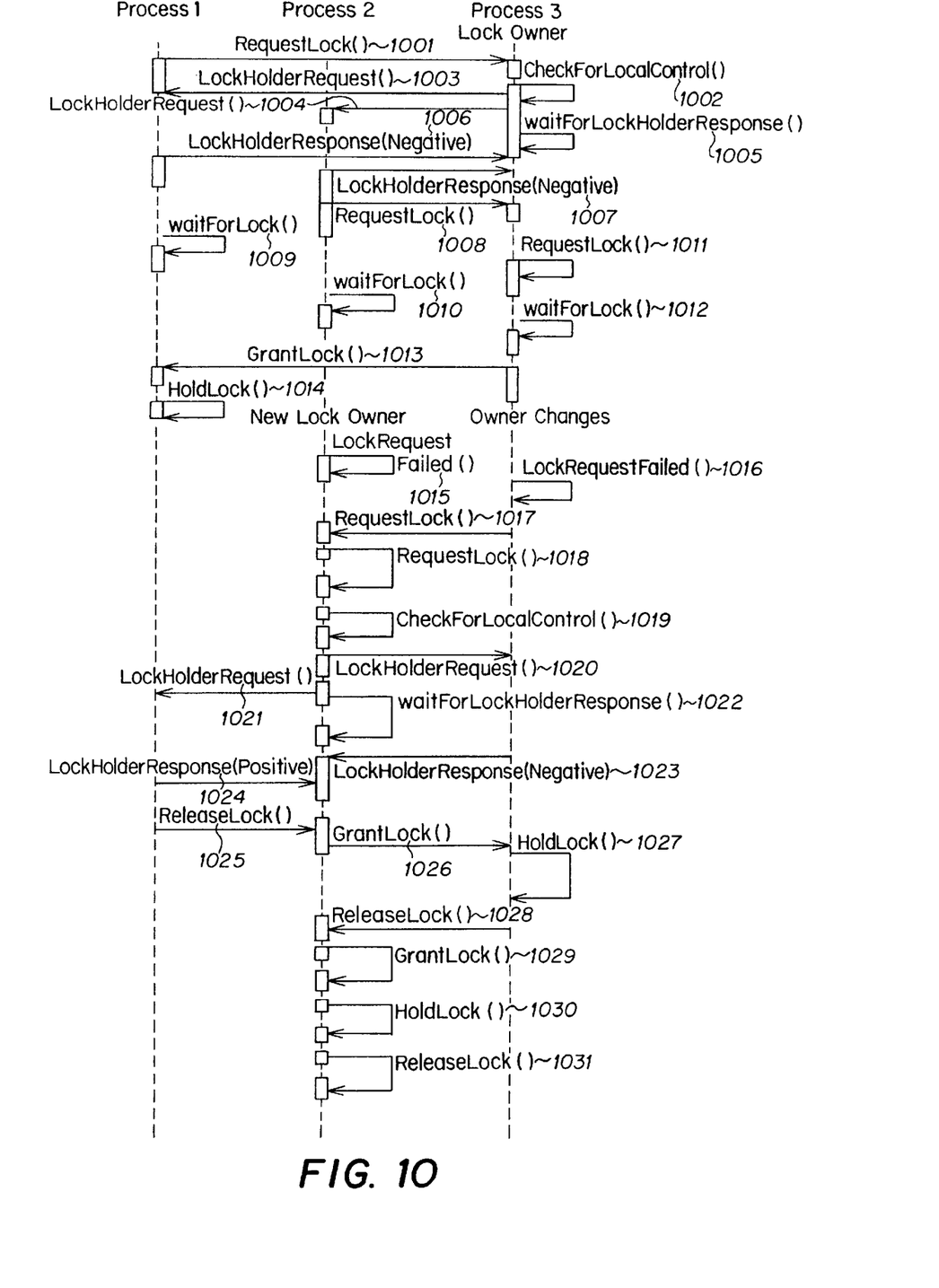
FIG. 10 is a timeline of a multiple lock request procedure where the lock owner process changes but the requesting process still holds the lock.

Steps 1001–1014 are the same as steps 901–914 in FIG. 9. While process 1 is holding the lock in step 1014, however, lock ownership changes from process 3 to process 2. Process 3, it should be noted, is still operating. Subsequently, processes 2 and 3 receive lock request failed messages (steps 1015, 1016) indicating that the process from which they had requested the lock is no longer the owner process. Note that these requests were made in steps 1008, 1011. Process 3 then sends a new Request Lock message to process 2 (step 1017) and process 2 also requests the lock (step 1018). Process 2, as the new lock owner, checks for local control of the lock (step 1019) and then sends Lock Holder Request messages to process 3 and process 1 (steps 1020, 1021) and waits for the Lock Holder Responses (step 1022). Process 3 returns a negative Lock Holder Response message (step 1023) while process 1 responds with a positive LockHolder Response (step 1024) since it is still holding the lock as from step 1014.

At some later point in time, process 1 releases the lock (step 1025) and the lock is then granted by process 2 to process 3 (step 1026) since the lock request of process 3 is the next request to be granted. Process 3 then enters the Hold Lock state (step 1027) and subsequently (step 1028) releases the lock back to process 2. The outstanding lock request from process 2 to itself is granted (step 1029) thus causing process 2 to enter the hold lock state (step 1030) and, at a later point in time, the lock is released by process 2 (step 1031).

It is clear that various modifications to the above-disclosed invention could be implemented by one of ordinary skill. For instance, the queue in which pending lock requests are placed could be a First-In, First-Out (FIFO) queue. Alternatively, the queue could be a priority queue where each requesting process has a priority level assigned to it and those requesting processes with higher priority levels are retrieved first. A FIFO queue would then be an example of a priority queue where all requesting processes have the same priority level.

Throughout the foregoing discussion, the processes have been described as communicating with each other. Interprocess communications (IPC) may take several forms based on the underlying system services, but all are message based (i.e., use message passing). Some system services that may be used for IPCs include:

shared memory pipes sockets

Each of these communication mechanisms exhibit slightly different behaviors and uses different semantics. Thus, there must be a message-based isolation layer that sits above the underlying system services. This isolation layer provides a consistent IPC interface to the higher layer functions.

By way of example, TCP sockets (integrated by the TCP Server module) can be used for guaranteed data delivery. UDP sockets can be used for non-critical data delivery and messaging. See D. Comer, "Internetworking with TCP/IP," Vol. 1, 2nd ed (1991), for a discussion of the TCP and UDP protocols. A TCP Server is a communications entity that uses TCP sockets (stream based, connection oriented, guaranteed data delivery) to emulate UDP sockets (packet based, connectionless, nonguaranteed data delivery). The resulting service is a packet based, connectionless, guaranteed data delivery service that provides several higher layer functions as well.

The TCP Server delivers data as packets through a connectionless interface. It also provides notification (through callbacks) of server status (contact established/lost), and data received to registered clients.

Thus, a TCP Server can provide three major services:

guaranteed data/message delivery (IPCs);

notification when data is received; and notification of server status changes (contact established/lost).

Alternatively, these functions may be provided by another protocol.

Having thus described various illustrative embodiments of the invention, various modifications will occur to those skilled in the art and such modifications are intended to be within the scope of the present invention.

What is claimed is:

1. A computer-implemented method of controlling access to an object shared amongst a plurality of processes in a distributed system, the method comprising steps of:

(a) assigning one process as an owner of a lock associated with the shared object;

(b) when a process requires access to the shared object, the process requesting the lock from the lock owner process;

(c) when the lock owner process receives the lock request, the lock owner process determining whether or not any process has control of the lock by sending a request to all processes inquiring if a process currently controls the lock associated with the shared object; and (d) when the lock owner process determines that no process has control of the lock, the lock owner process granting control of the lock to the requesting process.

2. The method as recited in claim 1, wherein step (c) includes a step of:

the lock owner process determining whether or not the lock owner process is currently accessing the shared object associated with the lock.

3. The method as recited in claim 1, wherein:

when a first requesting process has been granted control of the lock, the first requesting process sending a message to the lock owner process when the first requesting process no longer requires access to the shared object.

4. The method as recited in claim 3, wherein:

when a second requesting process sends a second lock request message to the lock owner process and the first requesting process has not sent a lock release message to the lock owner process, the lock owner process placing the second requesting process in a queue; and when the first requesting process sends the lock release message to the lock owner process, the lock owner process accessing the queue and granting control of the lock to the next requesting process in the queue.

5. The method as recited in claim 4, wherein the queue operates on a first-in, first-out basis.

6. The method as recited in claim 4, wherein the queue is a priority queue in that the next requesting process is that requesting process having a priority higher than any other requesting process in the queue.

7. The method as recited in claim 3, wherein:

when the lock owner process receives the lock release message from the first requesting process, the lock owner process determining whether there are any processes in the queue.

8. The method as recited in claim 1, including a step of:

the lock owner process placing the requesting process in a queue of processes waiting to receive control of the lock.

9. The method as recited in claim 8, further including a step of the lock owner process placing the requesting process in the queue according to a priority level assigned to each requesting process;

wherein a first requesting process in the queue with a priority level higher than a priority level of a second requesting process in the queue will be granted the lock first.

10. The method as recited in claim 8, wherein:

when the lock owner process has granted control to a first requesting process, the lock owner process waiting for a lock release message from the first requesting process; and when the lock owner process has received the lock release message, the lock owner process retrieving a next requesting process from the queue and granting control of the lock to the retrieved process.

11. The method as recited in claim 8, wherein step (c) includes a step of:

the lock owner process determining if a process is stored in the queue.

12. The method as recited in claim 1, wherein step (c) comprises:

the lock owner process waiting to receive a negative response from each other processes prior to granting control of the lock to the requesting process.

13. The method as recited in claim 12, wherein step (c) further comprises:

the lock owner process denying the control of the lock to the requesting process when a positive response is received from another process.

14. An apparatus for controlling access to an object shared amongst a plurality of processes in a distributed system, the apparatus comprising:

means for assigning one process as an owner of a lock associated with the shared object;

means for requesting the lock from the lock owner process when a process requires access to the shared object;

means for determining whether or not any process has control of the lock when the lock owner process receives the lock request including means for sending a request from the lock owner process to all processes inquiring if a process currently controls the lock associated with the shared object; and means for granting control of the lock to a requesting process when the lock owner determines that no process has control of the lock.

15. The apparatus as recited in claim 14, further comprising:

means for releasing the lock back to the lock owner process when the requesting process, to which the lock owner process had granted control, no longer requires the lock.

16. The apparatus as recited in claim 14, wherein the granting means comprises:

means for placing the requesting process in a queue when the lock owner process determines that a p process has control of the lock.

17. The apparatus as recited in claim 16, wherein the granting control means comprise:

means for retrieving a next requesting process from the queue and granting control of the lock to the next requesting process.

18. The method as recited in claim 1, wherein:

when the lock owner process fails, a new lock owner is chosen from amongst the remaining processes in the plurality of processes.

19. The apparatus as recited in claim 14, further comprising:

means for choosing a new lock owner process when the current lock owner process fails, the new lock owner process chosen from amongst the remaining processes in the plurality of processes.

* * * * *